US008434682B1

(12) United States Patent
Argue et al.

(10) Patent No.: US 8,434,682 B1
(45) Date of Patent: May 7, 2013

(54) RECEIPT IMAGES APPARATUS AND METHOD

(75) Inventors: Stuart Argue, Palo Alto, CA (US); Anthony Emile Marcar, San Francisco, CA (US)

(73) Assignee: Wal-Mart Stores, Inc., Bentonville, AK (US)

( * ) Notice: Subject to any disclaimer, the term of this patent is extended or adjusted under 35 U.S.C. 154(b) by 0 days.

(21) Appl. No.: 13/494,916

(22) Filed: Jun. 12, 2012

(51) Int. Cl.
*G06K 15/00* (2006.01)
(52) U.S. Cl.
USPC .......... 235/383; 235/379; 705/14.23; 705/35; 705/39
(58) Field of Classification Search .................. 235/383, 235/379; 705/14.23, 35, 39
See application file for complete search history.

(56) References Cited

U.S. PATENT DOCUMENTS

| | | | |
|---|---|---|---|
| 2008/0251575 A1* | 10/2008 | Bowling et al. | 235/375 |
| 2010/0138344 A1* | 6/2010 | Wong et al. | 705/44 |
| 2010/0211451 A1* | 8/2010 | Aoki | 705/14.31 |
| 2011/0004530 A1* | 1/2011 | Miyagawa et al. | 705/24 |
| 2012/0290422 A1* | 11/2012 | Bhinder | 705/21 |

* cited by examiner

*Primary Examiner* — Allyson Trail
(74) *Attorney, Agent, or Firm* — David R. Stevens; Stevens Law Group

(57) ABSTRACT

A method for printing an image on a receipt is disclosed. The method may begin with the initiation of a transaction such as a purchase or return at a point-of-sale system. Next, an image unique to the transaction may be obtained or generate. The image may comprise non-textual graphics. While the transaction is being performed, the image may be passed to a receipt printer and stored with memory thereof. Accordingly, the images may be stored in memory of the receipt printer before the other tasks associated with the transaction have all been performed. Finally, to complete and document the transaction, the receipt printer may print a receipt. The receipt may have the image printed thereon.

4 Claims, 7 Drawing Sheets

RECEIPT IMAGES APPARATUS AND METHOD

FIELD OF THE INVENTION

This invention relates to point-of-sale systems and more particularly to systems and methods for including images on printed receipts.

BACKGROUND OF THE INVENTION

Many point-of-sale (POS) systems currently in use today do not support important emerging technologies, services, and marketing opportunities. For example, many POS systems are limited in their ability to incorporate images on printed receipts. As a result, those POS systems cannot implement many novel methods and services that make use of such images. Accordingly, what is needed is an apparatus and method expanding the ability of a wide variety of POS systems, include legacy POS systems, to incorporate images on printed receipts.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
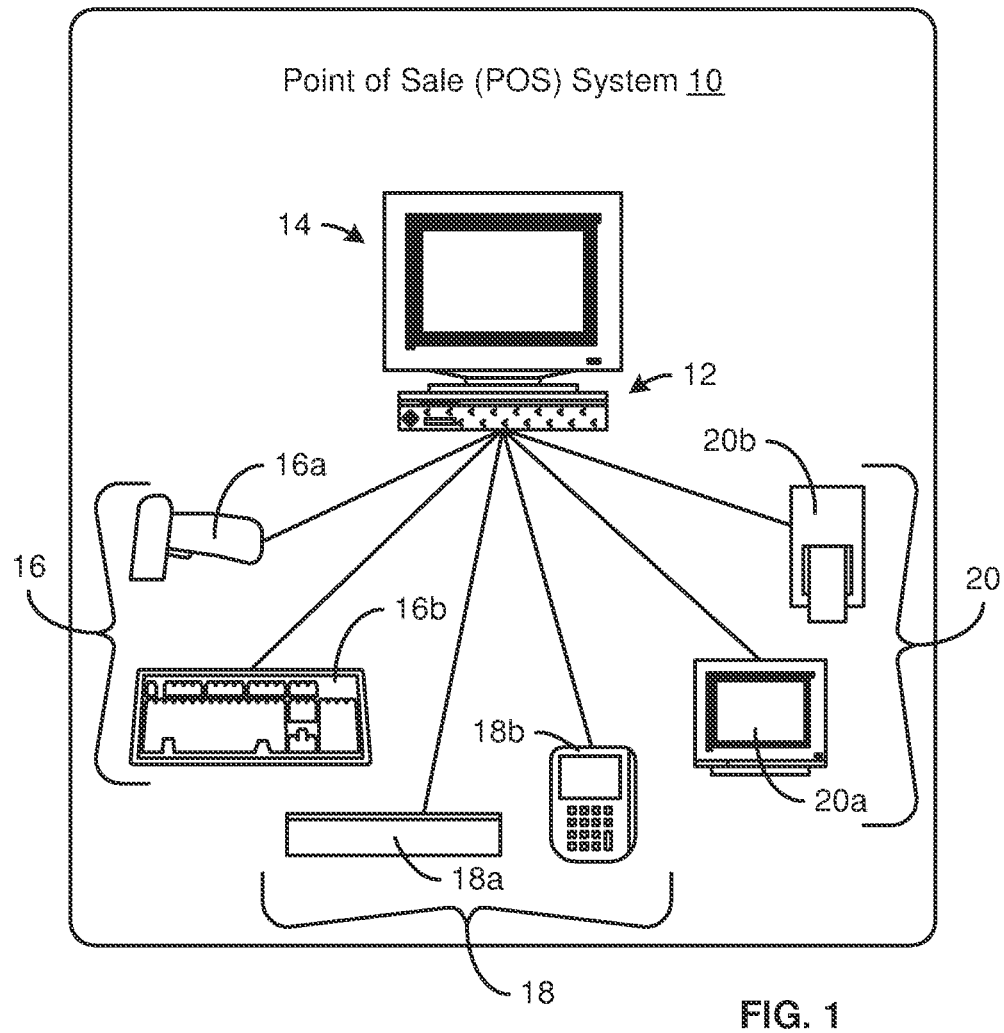
FIG. 1 is a schematic block diagram of one embodiment of a point-of-sale (POS) system for implement methods in accordance with the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, the invention has been developed to provide apparatus and methods for incorporating images on printed receipts. For example, in selected embodiments, it may be beneficial to include a graphical or image-based advertisement a paper receipt printed by a POS system.

An advertisement may include a call to action inviting or motivating a recipient of the receipt to take a particular step or action. To increase the likelihood that a consumer will respond favorably to the call to action, an advertisement may include a machine-readable code. Upon scanning the code, a consumer may be directed to a desired website, initiate the download of a particular application, or the like.

In certain embodiments, a machine-readable code may comprise a two-dimensional barcode (e.g., a Quick Response (QR) Code). The data encoded within a machine-readable code may vary between different embodiments and different purposes or goals of the advertisement. In selected embodiments, a machine-readable code may encode a transaction identification (ID) uniquely identifying a particular transaction documented by the corresponding receipt. Alternatively, or in addition thereto, a machine-readable code may encode an advertisement ID (e.g., an ID indicating which particular combination of call to action, graphics, or the like accompanied the machine-readable code).

In general, the purpose of an advertisement and the various components thereof may be to benefit, economically or otherwise, a consumer, an entity (e.g., an entity issuing the receipt), or some combination thereof. For example, in selected embodiments, the purpose of an advertisement may be to transition a customer from using paper receipts to using electronic (i.e., paperless) receipts.

Due to payload size, the time to pass an image-based advertisement to a receipt printer may be significant. If an advertisement were passed to a receipt printer at the very end of a transaction, then the consumer and cashier may be forced to wait some additional period of time. Thus, in selected embodiments in accordance with the present invention, one or more advertisements may be passed to and stored in memory of a receipt printer before the other tasks associated with a transaction have been completed. Accordingly, the time required to pass the advertisement(s) may be invisible to the consumer and cashier.

For example, after a transaction at a POS system has been initiated, various transaction-related tasks may be performed. The nature of such tasks may depend on the nature of the transaction. For example, if the transaction is a return of one or more items previously purchased, the tasks performed may include scanning the items, calculating various amounts of money to be returned to the consumer, returning the money to the consumer, or the like or some combination or sub-combination thereof.

Meanwhile, at the same time the transaction-related tasks are being performed, various steps or actions may be taken with respect to an advertisement. For example, after the transaction has been initiated, a transaction ID unique to the transaction may be obtained or generated. One or more new advertisements containing the transaction ID may be obtained or generated (e.g., an advertisement may be generated to include a two-dimensional barcode encoded with the transaction ID). If one or more old advertisements (e.g., advertisements encoded with the ID of a previous transaction) are stored within memory of a receipt printer, they may be removed, deleted, or simply written over. Finally, the one or more new advertisements may be stored in memory of the receipt printer. Thus, for many if not all transactions, one or more new advertisements may be stored before all the transaction-related tasks have been performed.

Once the transaction-related tasks have been performed, the data to be printed on a receipt may be finalized or concretely established. This finalization may include the selection of which advertisement of a plurality of advertisements would be most appropriate or beneficial to include on the receipt. The finalized receipt data may be sent to the receipt printer. The receipt printer may then print a receipt drawing data corresponding to the appropriate advertisement from memory as instructed. The transaction may then be completed or finished and the process may be repeated for a subsequent transaction.

In view of the foregoing, selected systems and methods in accordance with the present invention may enable images to be incorporated on a printed receipt. Moreover, they may enable each image to be unique to the printed receipt to which it is applied. Finally, they may accomplish these functions without excessively burdening a POS system or delaying the printing of the receipt.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer of a point-of-sale (POS) system, partly on a POS computer, as a stand-alone software package, on a stand-alone hardware unit, partly on a remote computer spaced some distance from the POS computer, or entirely on a remote computer or server. In the latter scenario, the remote computer may be connected to the POS computer through any type of network, including a local area network (LAN) or a wide area network (WAN), or the connection may be made to an external computer (for example, through the Internet using an Internet Service Provider).

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, in selected embodiments, the hardware, software, or hardware and software of a POS system 10 may be configured to implement one or more methods in accordance with the present invention. For example, a POS system 10 may be manufactured, programmed, modified, or upgraded to support expanded image-printing capabilities.

A POS system 10 in accordance with the present invention may include various components. In certain embodiments, a POS system 10 may include a central or primary computer 12, a monitor 14 (e.g., a cashier-facing monitor 14), one or more input devices 16 (e.g., scanners 16a, keyboards 16b, scales, or the like), one or more payment devices 18 (e.g., cash drawers 18a, card readers 18b) for receiving or returning payments, one or more output devices 20 (e.g., customer-facing display 20a or monitor 20a, receipt printer 20b), or the like or combinations or sub-combinations thereof.

A computer 12 may form the backbone of a POS system 10. Other components 16, 18, 20 forming part of a POS system 10 may communicate with the computer 12. Input devices 16 and certain payment devices 18 may feed data and commands to a computer 12 for processing or implementation. For example, a scanner 16a may pass data communicating the identity of one or more items to be purchased, returned, or the like to a computer 12. Similarly, a card reader 18b may pass payment information to a computer 12.

Conversely, output devices 20 and certain payment devices 18 may follow or implement commands issued by a computer 12. For example, a cash drawer 18a may open in accordance with the commands of a computer 12. Similarly, a customer-facing display 20a and receipt printer 20b may display or output data or information as instructed by a computer 12.

In selected embodiments, in addition to handling consumer transactions (e.g., purchases, returns), a POS system 10 may also provide or support certain "back office" functionality. For example, a POS system 10 may provide or support inventory control, purchasing, receiving and transferring products, or the like. A POS system 10 may also store sales and customer information for reporting purposes, marketing purposes, receivables management, trend analysis, cost analysis, price analysis, profit analysis, or the like. If desired or necessary, a POS system 10 in accordance with the present invention may include an accounting interface to pass certain information to one or more in-house or independent accounting applications.

Figure 2:
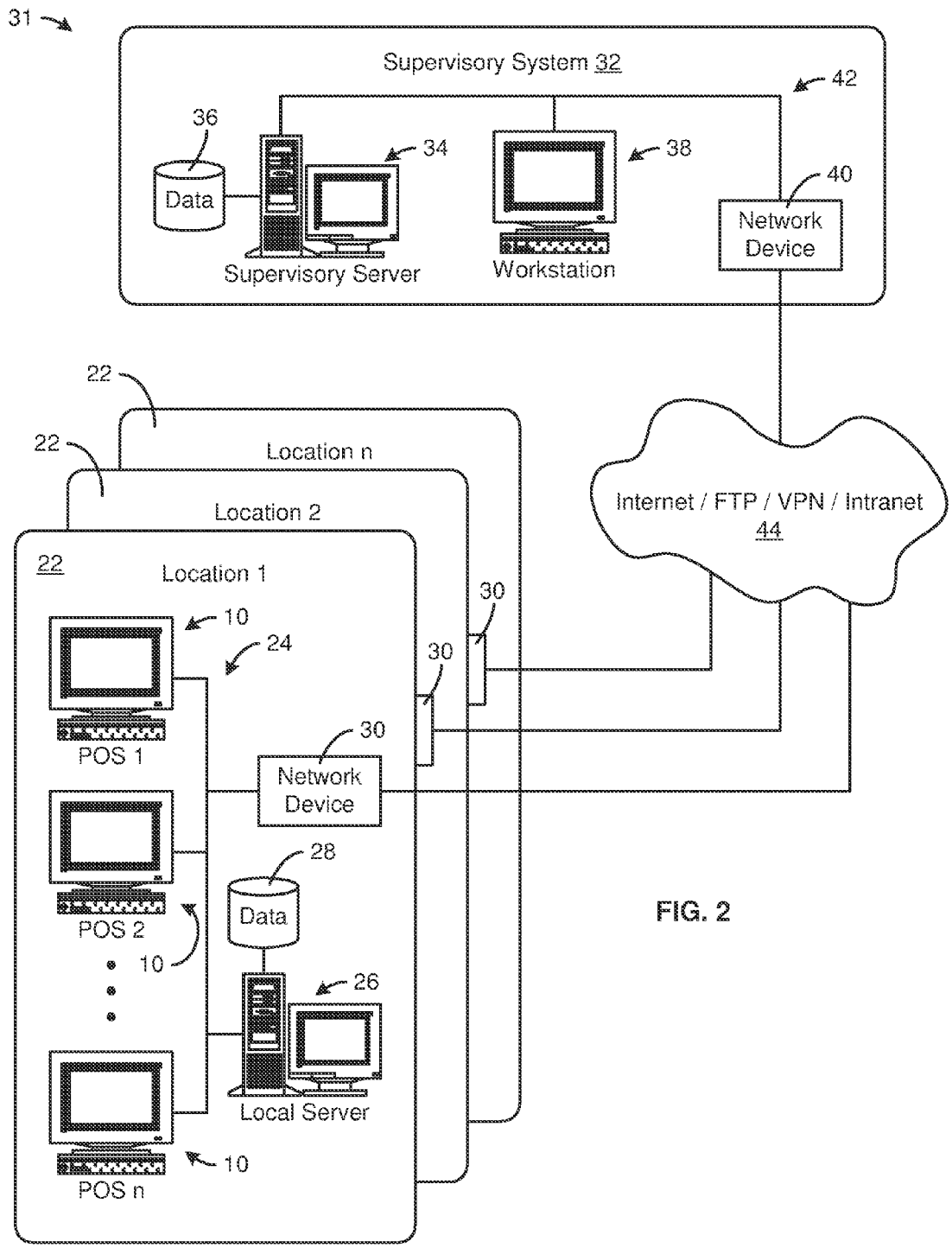
FIG. 2 is a schematic block diagram of one embodiment of multiple POS systems in accordance with the present invention operating in the context of an enterprise-wide system.

Referring to FIG. 2, in selected embodiments, a POS system 10 may operate substantially independently, as a stand-alone unit. Alternately, a POS system 10 in accordance with the present invention may be one of several POS systems 10 forming the front line of a larger system. For example, multiple POS systems 10 may operate at a particular location 22 (e.g., within a retail, brick-and-mortar store). In such embodiments, the various POS systems 10 may be interconnected via a LAN 24. A LAN 24 may also connect the POS systems 10 to a local server 26.

A local server 26 may support the operation of the associated POS systems 10. For example, a server 26 may provide a central repository from which certain data needed by the associated POS systems 10 may be stored, indexed, accessed, or the like. A server 26 may serve certain software to one or more POS systems 10. In certain embodiments, a POS system 10 may offload certain tasks, computations, verifications, or the like to a server 26.

Alternatively, or in addition thereto, a server 26 may support certain back office functionality. For example, a server 26 may receive and compile (e.g., within an associated database 28) data from the various associated POS systems 10 to provide or support inventory control, purchasing, receiving and transferring products, or the like. A server 26 may also receive and compile sales and customer information for reporting purposes, marketing purposes, receivables management, trend analysis, cost analysis, price analysis, profit analysis, or the like.

In certain embodiments, one or more POS systems 10 or servers 26 corresponding to a particular location 22 may communicate with or access one or more remote computers or resources via one or more network devices 30. For example, a network device 30 may enable a POS system 10 to contact outside resources and verify the payment credentials (e.g., credit card information) provided by a customer. A network device 30 may comprise a modem, router, or the like.

In selected embodiments, a POS system 10 in accordance with the present invention may operate within an enterprise-wide system 31 comprising multiple locations 22 (e.g., branches 22 or stores 22). In such embodiments, each location 22 may have one or more POS systems 10, local servers 26, local databases 28, network devices 30, or the like or combinations or sub-combinations thereof connected by a computer network (e.g., a LAN 24). Additionally, each such location 22 may be configured to interact with one or more supervisory systems 32. For example, multiple branch locations 22 may report to an associated "headquarters" location or system.

A supervisory system 32 may comprise one or more supervisory servers 34, databases 36, workstations 38, network devices 40, or the like or combinations or sub-combinations thereof. The various components of a supervisory system 32 may be interconnected via a computer network (e.g., a LAN 42). In selected embodiments, a supervisory system 32 may comprise one or more supervisory servers 34 providing a central repository from which certain data needed by the one or more POS systems 10 or local servers 26 may be stored, indexed, accessed, or the like.

Alternatively, or in addition thereto, a supervisory server 34 may receive and compile (e.g., within an associated database 36) data from the various associated POS systems 10 or local servers 26 to provide or support inventory control, purchasing, receiving and transferring products, or the like. A supervisory server 34 may also receive and compile sales and customer information for reporting purposes, marketing purposes, receivables management, trend analysis, cost analysis, price analysis, profit analysis, or the like.

A supervisory system 32 may be connected to one or more associated locations 22 or branches 22 in via any suitable computer network 44 (e.g., WAN 44). For example, in selected embodiments, one or more locations 22 may connect to a supervisor system 32 via the Internet. Communication over such a network 44 may follow any suitable protocol or security scheme. For example, communication may utilize the File Transfer Protocol (FTP), a virtual private network (VPN), intranet, or the like.

Figure 3:
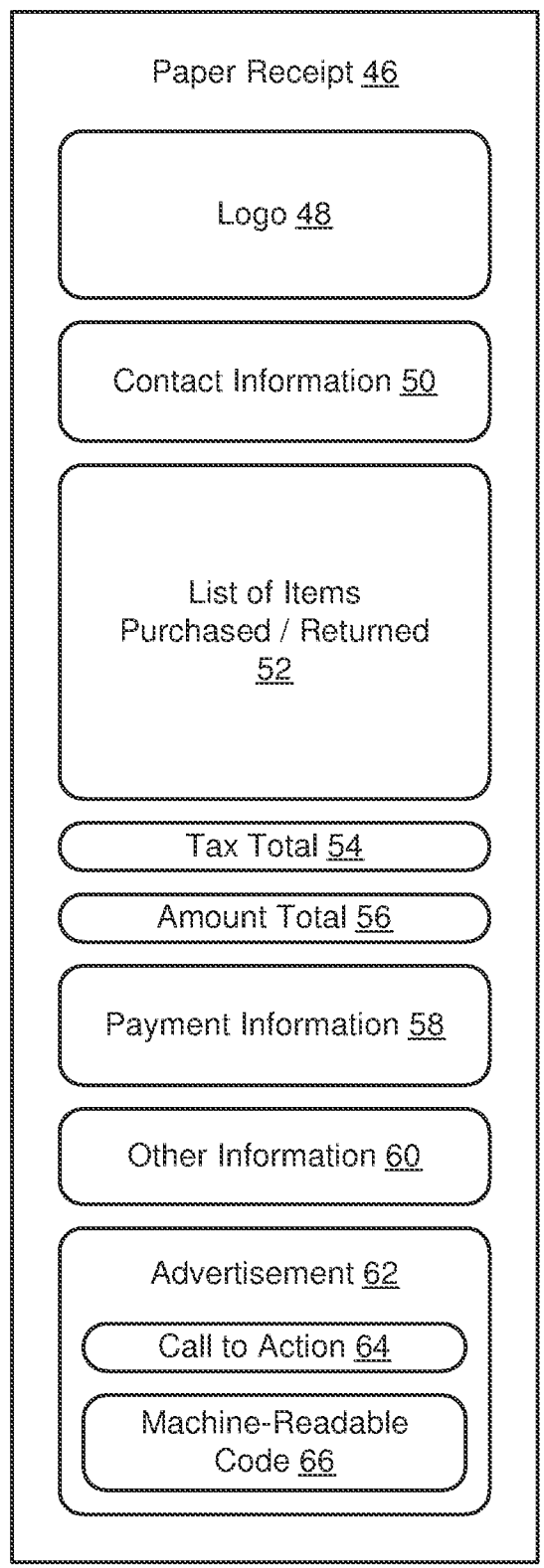
FIG. 3 is a schematic block diagram of one embodiment of receipt in accordance with the present invention.

Referring to FIG. 3, in selected embodiments in accordance with the present invention, a POS system 10 may output a receipt 46. For example, a printer 20b of a POS system 10 may output a paper receipt 46. A receipt 46 may perform various functions. Primarily, a receipt 46 may document a financial transaction (e.g., sale or return). However, a receipt 46 may also deliver one or more marketing messages to a consumer. In selected embodiments, a receipt 46 may include a logo 48, contact information 50, a list 52 of items purchased or returned, a total 54 indicating the sales tax assessed or returned, a total 56 indicating 56 the amount paid or returned, payment information 58, other information 60, or the like or combinations or sub-combinations thereof.

A logo 48 may reinforce the brand and image of the associated entity within the mind of a consumer. By including contact information 50 on a receipt 46, an entity may ensure that a customer has ready access to one or more physical addresses, Internet address, telephone numbers, facsimile numbers, hours of operation, or the like or combinations or sub-combinations thereof. One or more of a list 52 of items purchased or returned, a total 54 indicating the sales tax assessed or returned, a total 56 indicating 56 the amount paid or returned, and payment information 58 (e.g., date of transaction, an indication of method of payment, an indication of which credit or debit card was used, etc.) may be included to document important details of a transaction.

Other information 60 may be included within a receipt 46 as desired or necessary. For example, to promote brand loyalty, an entity may include an indication of an amount saved in the transaction, a yearly total of the amount saved, reward points earned, or the like. Alternatively, or in addition thereto, other information 60 may include promotional information, a solicitation to participate in a survey, an employment opportunity, contest information, or the like.

In selected embodiments, a receipt 46 may include an advertisement 62. An advertisement 62 may include a call to action 64 inviting or motivating a recipient of the receipt 46 to take a particular step or action. For example, a call to action 64 may invite or motive a consumer to visit a particular website, download a particular application, or the like. To increase the likelihood that a consumer will respond favorably to the call to action 64, an advertisement 62 may include an enabler facilitating the desired step or action. For example, in selected embodiments, an advertisement 62 may include a machine-readable code 66. Upon scanning the code 66 (e.g., scanning the code 66 using a camera on a mobile computing device such as mobile telephone, personal digital assistant (PDA), or tablet computer or reader, or the like), a consumer may be directed to a desired website (e.g., a particular URL), initiate the download of a particular application, initiate the download of a resource corresponding to a transactions (e.g., an electronic receipt), or the like.

A machine-readable code 66 may comprise a barcode. For example, in certain embodiments, a machine-readable code 66 may comprise a two-dimensional barcode. Two-dimensional barcodes may support or provide more data per unit area than can be obtained using a traditional one-dimensional barcode. Moreover, two-dimensional barcodes are typically configured to be scanned using a camera, an item that is commonly found on personal electronic devices. A two-dimensional barcode for use in accordance with the present invention may follow any suitable protocol, format, or system. In selected embodiments, a two-dimensional code may be embodied as a Quick Response (QR) Code.

The data encoded within a machine-readable code 66 may vary between different embodiments and different purposes (e.g., purposes or goals of an advertisement 62). In selected embodiments, a machine-readable code 66 may encode a transaction identification (ID). A transaction ID may uniquely identify a particular transaction documented by a corresponding receipt 46. Alternatively, or in addition thereto, a machine-readable code 66 may further encode an advertisement ID (e.g., an ID indicating which particular combination of call to action 64, graphics, or the like accompanied the machine-readable code 66). A machine-readable code 66 may also encode a web address or URL.

As with a machine-readable code 66, the nature or characteristics of an advertisement 62 and call to action 64 may vary according to a purpose thereof. In general, the purpose of an advertisement 62 and the various components 64, 66 thereof may be to benefit, economically or otherwise, a consumer, an entity (e.g., an entity issuing the receipt 46), or some combination thereof. For example, in selected embodiments, the purpose of an advertisement 62 may be to transition a customer from using paper receipts 46 to using electronic (i.e., paperless) receipts.

At one level, the use of electronic receipts may conserve natural resources by reducing the need for and consumption of paper. However, the use of electronic receipts may have other advantages to both a consumer and an entity issuing the electronic receipts. For example, electronic receipts may enable a consumer to more easily collect and keep a highly detailed record of his or her spending. Entities issuing electronic receipts may benefit from additional marketing opportunities that the electronic receipts provide.

Figure 4:
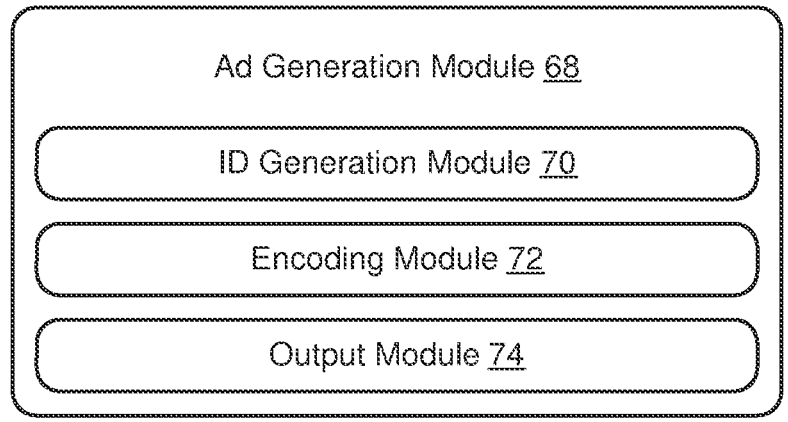
FIG. 4 is a schematic block diagram of one embodiment of an ad module in accordance with the invention.

Referring to FIG. 4, in selected embodiments, an ad module 68 may be tasked with obtaining or generating an advertisement 62 and delivering it to a printer 20b for inclusion within a receipt 46. An ad module 68 may include any suitable arrangement of sub-components or modules. In certain embodiments, an ad module 68 may include an ID generation module 70, an encoding module 72, an output module 74, or the like or some combination or sub-combination thereof.

An ID generation module 70 may generate one or more identifications to be incorporated within an advertisement 62. For example, an ID generation module may 70 may obtain or generate an ID unique to each transaction processed within a POS system 10, location 22, or enterprise-wide system 31. Alternatively, or in addition thereto, an ID generation module 70 may obtain or generate an ID for each advertisement 62 processed within a POS system 10, location 22, or enterprise-wide system 31.

An encoding module 72 may generate a machine-readable code 66 encoded with various data, including a transaction ID, advertisement ID, or the like or some combination thereof. Once a machine-readable code 66 has been generated, an output module 74 may pass the machine-readable code 66 or an advertisement 62 containing the machine-readable code 66 on to an appropriate component within a POS system 10, location 22, or enterprise-wide system 31. For example, an output module 74 may pass an advertisement 62 on to a receipt printer 20b.

The various functions or modules of an ad module 68 may be enacted or implemented by any suitable system or component thereof. For example, in selected embodiments, an ad module 68 may be implemented partially or entirely as a "virtual printer" residing on a primary computer 12 of a POS system 10. Alternatively, one or more functions or modules of an ad module 68 may be enacted or implemented by a "box" positioned in the line of communication between a primary computer 12 and a receipt printer 20b. A box may monitor and modify certain communications passing between the computer 12 and the printer 20b. If necessary, a box may access a LAN 24 or WAN 44 to gather additional resources or information as necessary.

In still other embodiments, one or more functions or modules of an ad module 68 may be distributed across various hardware devices, including a primary computer 12 of a POS system 10, a local server 26, a supervisory server 34, or the like or combinations or sub-combinations thereof. Thus, systems and method in accordance with the present invention may be adapted to a wide variety of situations, including more rigid legacy systems.

Figure 5:
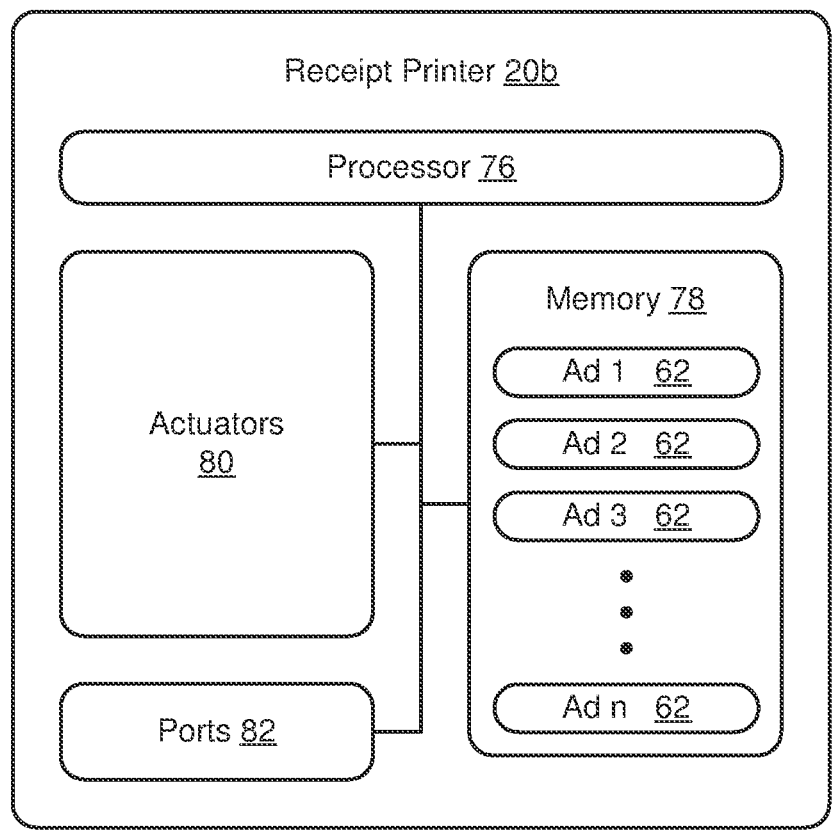
FIG. 5 is a schematic block diagram of one embodiment of a receipt printer in accordance with the invention.
Figure 6:
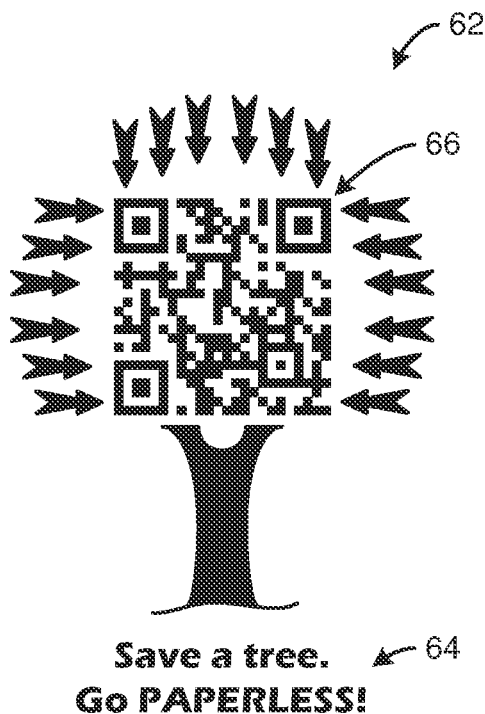
FIG. 6 is an illustration of one embodiment of an advertisement in accordance with the present invention.
Figure 7:
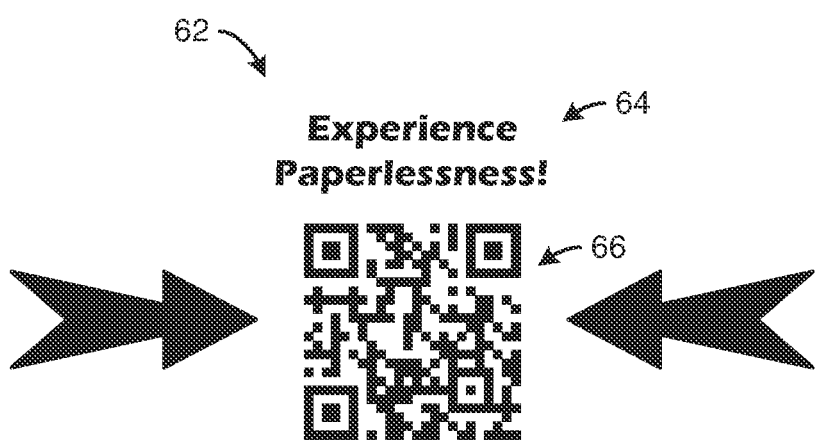
FIG. 7 is an illustration of an alternative embodiment of an advertisement in accordance with the present invention.

Referring to FIGS. 5-7, a receipt printer 20b in accordance with the present invention may have any suitable configuration or combination of components. In selected embodiments, a receipt printer 20b may include a processor 76, memory 78 (e.g., one or more memory devices), one or more actuators 80, and one or more ports 82. A processor 76 may issue various commands controlling operations of the printer 20b. Memory 78 may store certain operating software and other information as desired or necessary. Actuators 80 may bring about the desired printing (e.g., manipulation of a print head, scanning laser, rollers, etc.) as instructed by a processor 76. A port 82 may provide a mechanism through which a printer 20b may receive data characterizing or indicating what is to be printed.

In general, consumers relay heavily on visual cues. Accordingly, an advertisement 62 may include a significant graphical component. That is, an advertisement 62 in accordance with the present invention may impact a consumer through images, stylization, or the like, rather than just through plain text. Thus, in certain embodiments, some portion or all of an advertisement 62 may be passed within a POS system 10 as an image (e.g., passed to a receipt printer 20b as an image) and printed as an image, not as text. For example, an advertisement 62 (or a significant portion thereof) may be passed to a receipt printer 20b in a stream including a raster-coded image or bitmap.

Due to payload size, the time to pass an image-based advertisement 62 to a printer 20b may be significant. Accordingly, if an advertisement 62 were passed to a receipt printer 20b at the very end of a transaction, then the consumer and cashier may be forced to wait some additional period of time (e.g., two to four seconds or more). Such a delay may be frustrating to all involved. Moreover, when viewed in the aggregate, such delays may represent a significant loss of revenue. Accordingly, systems and methods in accordance with the present invention may be configured to process image-based advertisements 62 without injecting delay into a transaction. For example, in selected embodiments, one or more advertisements 62 may be passed to and stored in memory 78 of a receipt printer 20b before the other tasks associated with a transaction have been completed. Accordingly, the time required to pass the advertisement(s) may be invisible to the consumer and cashier.

Figure 8:
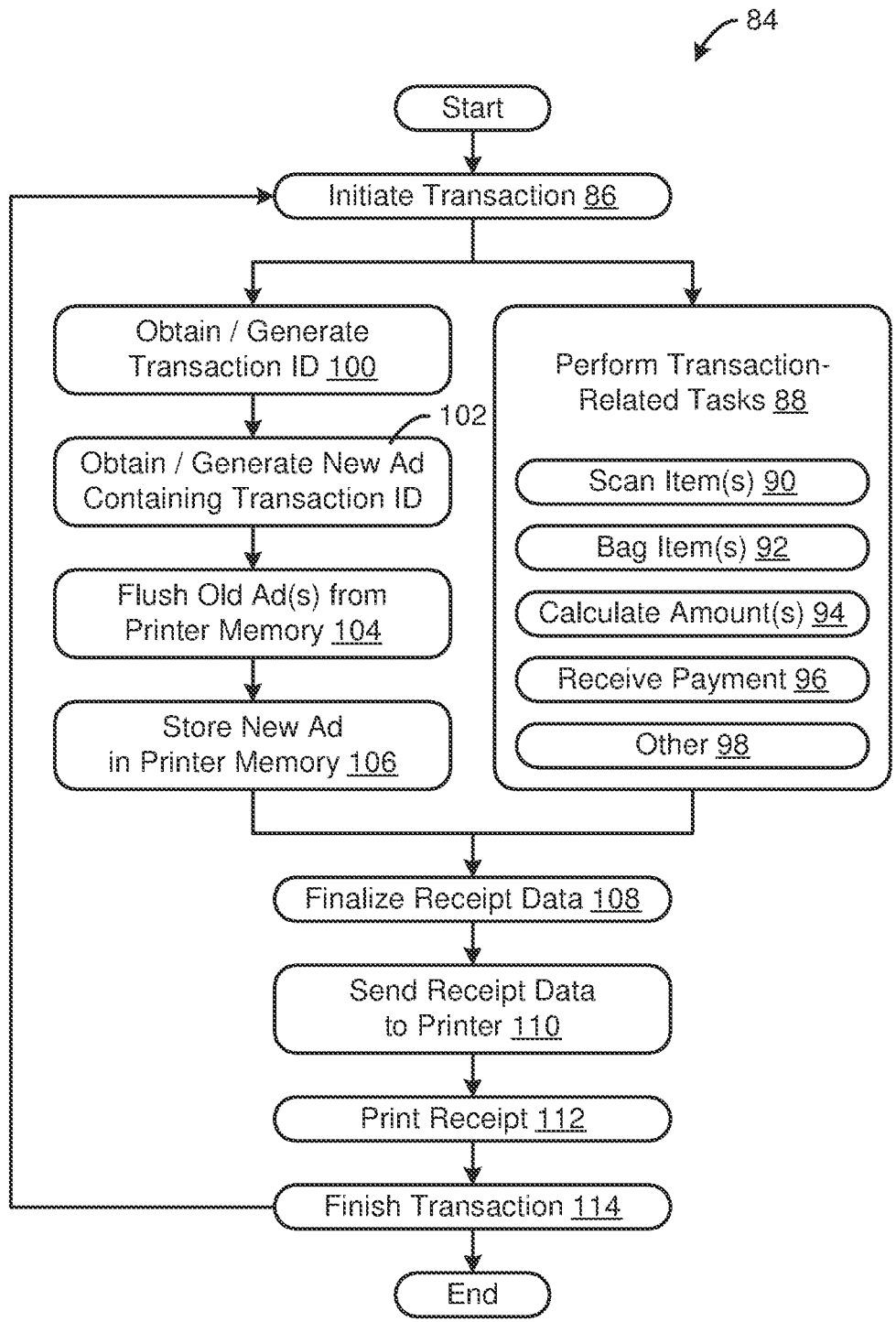
FIG. 8 is a block diagram of one embodiment of a method for printing an image on a receipt in accordance with the invention.

Referring to FIG. 8, in certain embodiments, a method 84 in accordance with the present invention may begin when a transition (e.g., a purchase, return, or the like) is initiated 86 at a POS system 10. After initiation 86, various transaction-related tasks may be performed 88. The nature of such tasks may depend on the nature of the transaction. For example, if the transaction is a purchase of a plurality of items, the tasks performed 88 may include scanning 90 the items, bagging 92 the items, calculating 94 various amounts (e.g., amount of discount, amount of tax due, total amount due), receiving 96 payments (e.g., receiving and counting a cash payment, processing a credit or debit card payment), performing 98 some other task, or the like or some combination or sub-combination thereof.

Meanwhile, at the same time the transaction-related tasks are being performed 88, various steps or actions may be taken with respect to an advertisement 62. For example, after initiation 86, a transaction ID unique to the transaction may be obtained 100 or generated 100. A new advertisement 62 containing the transaction ID may be obtained 102 or generated 102. For example, an advertisement 62 may be generated to include a two-dimensional barcode encoded with the transaction ID. If any old advertisement 62 (e.g., an advertisement 62 encoded with the ID of a previous transaction) is stored within memory 78 of a receipt printer 20b, it may be removed 104, deleted 104, or simply written over. Finally, the new advertisement 62 may be stored 106 in memory 78 of the receipt printer 20b. Thus, for many if not all transactions, a new advertisement 62 may be stored 106 before all the transaction-related tasks have been performed 88.

Once the transaction-related tasks have been performed 88, the data to be printed on a receipt 46 may be finalized 108 or concretely established 108 and sent 110 to the receipt printer 20b. The receipt printer 20b may then print 112 a receipt 46 drawing data corresponding to the advertisement 62 from memory 78 as instructed. The transaction may then be completed 114 or finished 114. Accordingly, a new or subsequent transaction may be initiated 86 and the method 84 may be repeated for another transaction.

Figure 9:
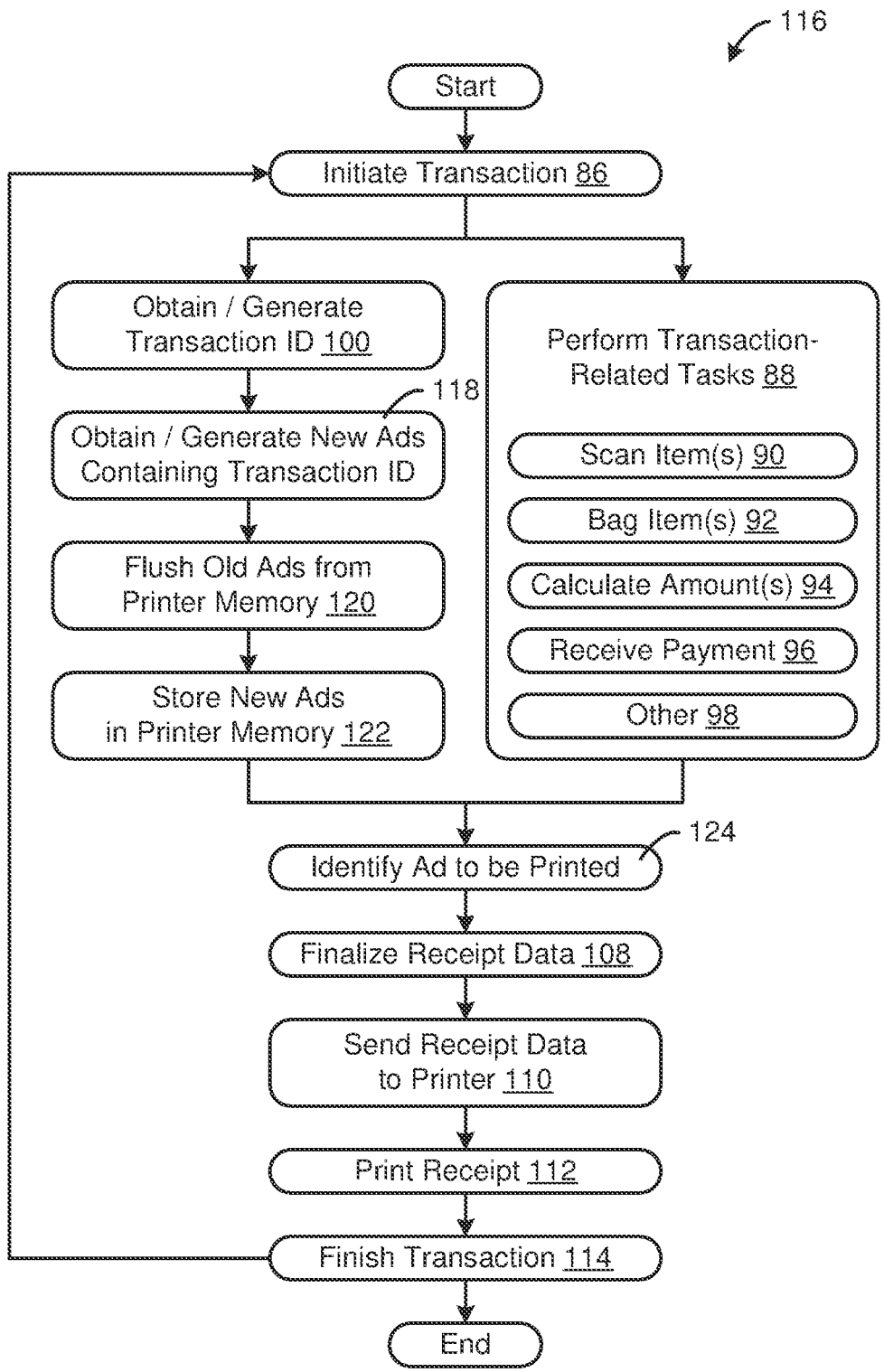
FIG. 9 is a block diagram of an alternative embodiment of a method for printing an image on a receipt in accordance with the present invention.

Referring to FIG. 9, in selected embodiments, insufficient information may be present at the initiation 86 of a transaction to concretely know which advertisement 62 (e.g., which graphic or call to action 64) should be printed on a receipt 46. Accordingly, in an alternative method 116, a plurality of new advertisements 62 may be obtained 118 or generated 118. Each of the new advertisements 62 may contain the transaction ID. If a plurality of old advertisements 62 are stored within memory 78 of a receipt printer 20b, they may be removed 120, deleted 120, or written over. Finally, the new advertisements 62 may be stored 122 in memory 78 of the receipt printer 20b.

Once the transaction-related tasks have been performed 88, all relevant information may be at hand and accessible. A determination 124 may then be made as to which advertisement 62 best fits the receipt 46. Accordingly, the ID of the advertisement selected 124 may be included within the final receipt data. Thus, significant flexibility in printing images may be obtained without lengthening or slowing a transaction.

The flowchart and block diagrams in the FIGS. 8 and 9 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figures. In certain embodiments, two blocks shown in succession may, in fact, be executed substantially concurrently, or the blocks may sometimes be executed in the reverse order, depending upon the functionality involved. For example, in the illustrations, the flushing 104, 120 of the old advertisement 62 or advertisements 62 occurs after a new transaction has been initiated 86 and a transaction ID has been obtained 100 or generated 100. However, the flushing 104, 120 may occur at some other time. For example, the flushing 104, 120 may occur after one transaction is finished 114 and before the next transaction is initiated 86.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for printing an image on a receipt, the method comprising:
    initiating a first transaction at a point-of-sale system to effect a purchase a first plurality of items;
    obtaining a first plurality of images, each image thereof being unique among the first plurality of images, being unique to the first transaction, and comprising non-textual graphics;
    storing the first plurality of images in memory of a printer of the point-of-sale system;
    completing the storing before all items of the first plurality of items are scanned into the point-of-sale system;
    selecting a particular image of the first plurality of images;
    finalizing the first transaction; and
    printing, by the printer after the finalizing, the particular image on a receipt documenting the first transaction.

2. The method of claim 1, further comprising initiating, after the printing, a second transaction at the point-of-sale system to effect a purchase a second plurality of items.

3. The method of claim 2, further comprising deleting, after the printing, the first plurality of images from the memory of the printer.

4. The method of claim 3, further comprising:
obtaining a second plurality of images, each image thereof being unique among the second plurality of images, being unique to the second transaction, and comprising non-textual graphics; and
storing the second plurality of images in memory of the printer.

* * * * *